United States Patent [19]

Iwata

[11] 4,145,223
[45] Mar. 20, 1979

[54] FRICTIONAL MATERIAL FOR BRAKES

[75] Inventor: Koichi Iwata, Itami, Japan

[73] Assignee: Sumitomo Electric Industries, Ltd., Osaka, Japan

[21] Appl. No.: 846,472

[22] Filed: Oct. 28, 1977

[30] Foreign Application Priority Data

Nov. 25, 1976 [JP] Japan ............................... 51-141921

[51] Int. Cl.² ............................................... C09K 3/14
[52] U.S. Cl. ....................................... 106/36; 51/298; 260/38
[58] Field of Search .................... 51/298, 299; 260/39, 260/38; 106/36

[56] References Cited

U.S. PATENT DOCUMENTS

| | | | |
|---|---|---|---|
| 3,210,303 | 10/1965 | Biggs | 51/298 |
| 3,494,884 | 2/1970 | Kraft | 51/298 |
| 3,959,194 | 5/1976 | Adelmann | 51/298 |

*Primary Examiner*—Donald J. Arnold
*Attorney, Agent, or Firm*—Sughrue, Rothwell, Mion, Zinn and Macpeak

[57] ABSTRACT

A frictional material for brakes employs as a reinforcing material a fibrous material other than asbestos and contains non-fibrous serpentine in the amount of 5 to 80% in contents by volume. The non-fibrous serpentine has the same chemical composition as asbestos but a different crystaline structure. Since the serpentine is non-fibrous, a fibrous reinforcing material must be added. Suitable fibrous reinforcing materials are chopped glass fiber strands, cut steel wires, organic synthetic fibers and ceramic fibers.

5 Claims, 1 Drawing Figure

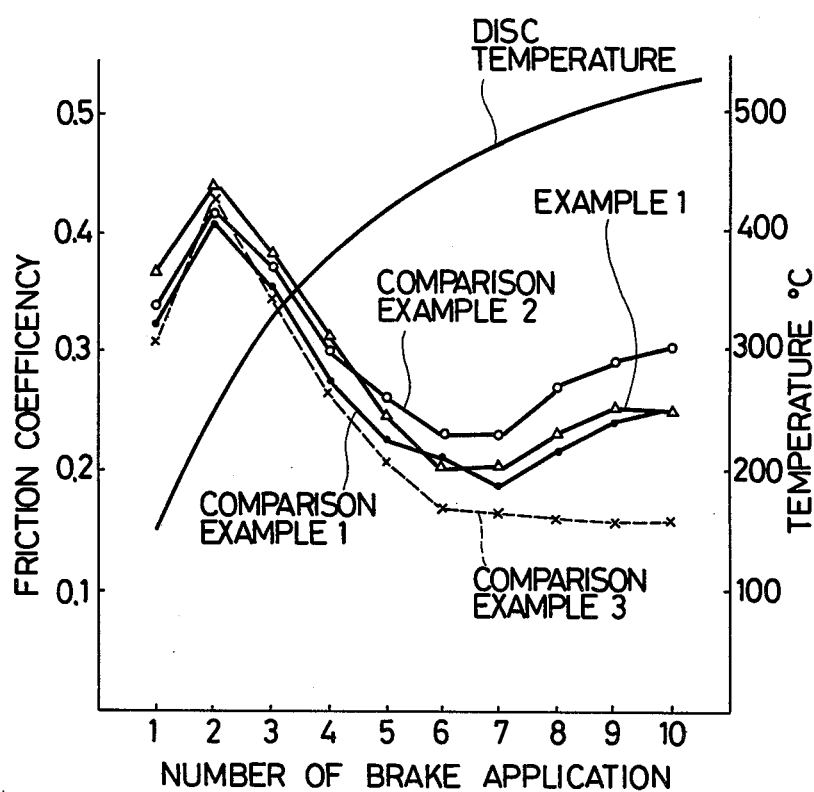

FRICTIONAL MATERIAL FOR BRAKES

BACKGROUND OF THE INVENTION

This invention generally relates to compositions of materials for use as the frictional material for automobile brakes, clutches and the like, and more particularly to such materials which do not use crysotile asbestos as their principle frictional component.

Crysotile asbestos (hereinafter referred to merely as "asbestos") has been the standard frictional component of brake and clutch materials for automobiles. In addition to providing excellent frictional and fade resistant characteristics in these applications, asbestos being fibrous performs the function of a reinforcing material. However, the use of asbestos has certain disadvantages. First, in a country such as Japan where asbestos is not a naturally abundant substance, most of the asbestos must be imported from foreign countries. Moreover, the asbestos deposits in those foreign countries in rapidly being depleted. With the supply decreasing and the necessity for importation, the price of asbestos continues to increase. Second, there is now substantial evidence that asbestos is hazardous to health. Because of these substantial disadvantages, there is now a strong demand for a frictional material which does not contain asbestos.

SUMMARY OF THE INVENTION

Accordingly, this invention relates to frictional materials having excellent frictional characteristics and in which a fibrous material other than asbestos, namely, glass fibers, organic synthetic fibers, metallic fibers, or ceramic fibers are employed as a reinforcing material, and synthetic resin such as phenol resin is employed as a bonding agent. More specifically, the principle frictional component of the frictional component is non-fibrous serpentine in the amount of 5 to 80% in contents by volume. The non-fibrous serpentine has the same chemical composition as asbestos but a different crystalline structure. Besides exhibiting frictional characteristics which are comparable to asbestos, non-fibrous serpentine is plentiful in Japan, and therefore relatively inexpensive, and does not present a hazard to health.

BRIEF DESCRIPTION OF THE DRAWING

A single FIGURE in the accompanying drawing is a graphical representation indicating the variations in friction coefficient obtained by comparing the test results of the examples of this invention with those of the comparison examples.

DETAILED DESCRIPTION OF THE INVENTION

The excellent frictional properties of frictional materials containing asbestos are due to not only the reinforcement effect of the asbestos fibers but also the following:

a. The Mohs' hardness of frictional materials containing asbestos is 3 to 4, that is, the asbestos containing frictional material is approximately as soft as cast iron which is the usual mating material rubbed by the asbestos containing frictional material. Accordingly, the mating material is scarcely damaged, and an abnormal sound such as a scraping sound is hardly generated.

b. Upon application of the brakes, frictional heat is generated, as a result of which the asbestos in the frictional material is partially decomposed to create a material such as olivine forsterite. This material thus created serves to increase the coefficient of friction of the frictional material, thereby preventing the reduction of the coefficient of friction after heat history.

If no asbestos is used in the frictional materials, the two important features described above cannot be utilized. Therefore, disadvantages such as damage to the mating material, generation of brake noise, and reduction of the coefficient of friction after heat history would be expected. However, the applicant has found that the foregoing advantages may be realized by using non-fibrous serpentine in frictional materials.

The properties of asbestos and non-fibrous serpentine are indicated in Table 1.

TABLE 1

| | Asbestos | Serpentine |
|---|---|---|
| Standard chemical compostion | $3MgO \cdot 2SiO_2 \cdot 2H_2O$ | $3MgO \cdot 2SiO_2 \cdot 2H_2O$ |
| Crystal system form | Monoclinic and rhombic fibers | Fine block |
| Mohs' hardness | 3–4 | 3–4 |
| Thermal decompostion temperature | 600–700° C | 550–650° C |
| Material produced by thermal decompostion | Olivine forsterite | Olivine forsterite |
| Source | Imported from foreign countries (mainly from Canada) | Plentiful in Japan |
| Cost | Relatively high (tending to increase | Low |

As is apparent from Table 1, asbestos and non-fibrous serpentine are similar in properties to each other, although those materials are different in crystal system and in form from each other. It should be noted that asbestos and non-fibrous serpentine have the same Mohs' hardness and produce the same material by thermal decomposition. In addition, unlike asbestos which is readily available, non-fibrous serpentine is plentifully produced in Japan and is therefore low in cost in that country. And non-fibrous serpentine, unlike asbestos, is not fibrous in form, and therefore it is considered that non-fibrous serpentine is not hazardous to health.

The present invention therefore is a frictional material which employs as a reinforcing material a fibrous material other than asbestos and contains non-fibrous serpentine in the amount of 5 to 80% in quantity by volume. When the non-fibrous serpentine in the amount of less than 5% is employed, no frictional effect of the non-fibrous serpentine can be detected. When the non-fibrous serpentine is used in an amount greater than 80%, the strength of the frictional material decreases. The reinforcing material may be glass fibers, steel fibers, organic synthetic fibers and ceramic fibers. Examples of suitable ceramic fibers are alumina, silica, magnesia, zirconium, kaolin, and rock wool. A thermoplastic or thermosetting resin binder such as a phenolic resin is preferably used in the amount of 10 to 20% in contents by volume. The friction material preferably includes cashew dust as a friction modifier. As one example, cashew dust produced by Tohoku Kako under the designation FF-1081 is used. However, instead of cashew dust, other friction modifiers such as rubber powder and phenolic resin dust may be used. It is preferred that the friction material include an inorganic filler composed of barium sulfate and graphite in a ratio of approximately 2:1. However, metal powder, metal oxide powder, metal sulfide, metal sulfate and various ceramics may be used as an inorganic filler.

Based on the above-described facts, non-fibrous serpentine and a variety of fibrous materials were combined to produce frictional materials for the pads of a disk brake. The frictional materials thus produced show excellent data as illustrated by the following examples and comparison examples:

Comparison Example 1

| Composition | Contents by volume (%) |
|---|---|
| Asbestos | 40 |
| Non-fibrous serpentine | 0 |
| Phenolic resin binder | 15 |
| Cashew dust | 15 |
| Inorganic filler (20% Barium Sulfate and 10% Graphite) | 30 |

A mixture is prepared by uniformly mixing the asbestos whose fibers have been sufficiently opened and the remaining powder materials. Then, the mixture thus prepared is hot-pressed at a temperature of 150 – 160° C under a pressure of 200 Kg/cm² for 15 minutes, and is molded on a supporting plate. The mixture is heated and cured at a temperature of 180° C.

Comparison Example 2

| Composition | Contents by volume (%) |
|---|---|
| Asbestos | 20 |
| Non-fibrous serpentine | 20 |
| Phenolic resin binder | 15 |
| Cashew dust | 15 |
| Inorganic filler (20% Barium Sulfate and 10% Graphite) | 30 |

The frictional material is made in the same manner as that in comparison example 1.

Comparison Example 3

| Composition | Contents by volume (%) |
|---|---|
| Glass fibers (cut 3mm in length) | 40 |
| Non-fibrous serpentine | 0 |
| Phenolic resin binder | 15 |
| Cashew dust | 15 |
| Inorganic filler (20% Barium Sulfate and 10% Graphite) | 30 |

The glass fibers may be obtained by cutting a single glass fiber. It is preferable that the glass fibers are bundled with resin or the like. In addition, preferably the surface of the glass fibers are coated with graphite. The frictional material is produced in a manner similar to that in comparison example 1.

EXAMPLE 1

| Composition | Contents by volume (%) |
|---|---|
| Glass fibers | 20 |
| Non-fibrous serpentine | 20 |
| Phenolic resin binder | 15 |
| Cashew dust | 15 |
| Inorganic filler (20% Barium Sulfate and 10% Graphite) | 30 |

The glass fibers used are the same as those in comparison example 3. The conditions of production of the frictional material are the same as those in comparison example 1.

EXAMPLE 2

| Composition | Contents by volume (%) |
|---|---|
| Steel fibers (cut 3mm in length) | 20 |
| Non-fibrous serpentine | 20 |
| Phenolic resin binder | 15 |
| Cashew dust | 15 |
| Inorganic filler (20% Barium Sulfate and 10% Graphite) | 30 |

The steel fibers used are obtained by cutting medium carbon steel having a carbon content between 0.01% and 1.0%; however, they may be obtained by cutting other materials such as stainless steel. It is preferable that the steel fibers are coated with graphite. Steel fibers irregular and intricate in shape as in cuts are more preferable than those regular and smooth in shape as in wires, because the former have a greater reinforcement effect. The conditions of production of the frictional material are the same as those in comparison example 1.

EXAMPLE 3

| Composition | Contents by volume (%) |
|---|---|
| Phenol fibers (Trade Mark Knyol) | 20 |
| Non-fibrous serpentine | 20 |
| Phenolic resin binder | 15 |
| Cashew dust | 15 |
| Inorganic filler (20% Barium Sulfate and 10% Graphite) | 30 |

The conditions of production of the frictional material are the same as those in comparison example 1.

The results of the friction tests on the examples and the comparison examples carried out with a dynamometer are indicated in Table 2 and the accompanying drawing.

TABLE 2

| | Comparison of friction coefficients before and after fade test | | |
|---|---|---|---|
| | (A) Before fade | (B) After fade | Difference (A−B) |
| Comparison example 1 | 0.34 | 0.43 | +0.09 |
| Comparison example 2 | 0.39 | 0.41 | +0.02 |
| Comparison example 3 | 0.40 | 0.30 | −0.10 |
| Example 1 | 0.39 | 0.40 | +0.01 |
| Example 2 | 0.36 | 0.37 | +0.01 |
| Example 3 | 0.38 | 0.39 | +0.01 |

As is apparent from Table 2, in Comparison Example 3 in which the glass fibers are employed instead of the asbestos the coefficient of friction is considerably reduced when compared with Comparison Examples 1 and 2. On the other hand, in Example 3 in which the glass fibers and the non-fibrous serpentine are employed in combination, the drawback described above is completely complemented or eliminated. Similarly, satisfactory results were obtained also in Example 2 where the steel fibers are used and in Example 3 where the phenol fibers are used.

In the accompanying drawing, the variations of the coefficients of friction in the fade tests are indicated. In Comparison Examples 1 and 2, the coefficient of friction reaches the minimum value at the fifth or sixth application of the brakes and is restored thereafter. On the other hand, in Comparison Example 3, the coefficient of friction has no tendency of restoration after the fifth or sixth application of the brakes. In contrast to this, in Example 1 a tendency of restoration is clearly indicated although no asbestos is employed therein. In Examples 2 and 3 also, the same results as those in Example 1 were obtained. Thus, it can be said that this invention is excellent, providing a novel technique of producing frictional materials for brakes.

What is claimed is:

1. A frictional material for brakes employing as a reinforcing material a fibrous material selected from the group consisting of glass fiber, steel wire, organic synthetic fiber and ceramic fiber and containing non-fibrous serpentine by 5 to 80% in contents by volume.

2. A frictional material as claimed in claim 1 in which glass fiber chopped strands are employed as said reinforcing material.

3. A frictional material as claimed in claim 1 in which cut wires obtained from carbon steel having a carbon content of 0.01% to 1.0% or stainless steel are employed as said reinforcing material.

4. A frictional material as claimed in claim 1 in which a thermoplastic or thermosetting resin fiber material is employed as said reinforcing material.

5. A frictional material as claimed in claim 3 in which the cut wires are intricate and irregular in shape and are employed as said reinforcing material.

* * * * *